United States Patent [19]
Meeks

[11] Patent Number: 5,871,642
[45] Date of Patent: Feb. 16, 1999

[54] MAGNETIC LIQUID CONDITIONER

[76] Inventor: Jasper L. Meeks, P.O. Box U, Clyde, Tex. 79510

[21] Appl. No.: 658,851

[22] Filed: May 31, 1996

[51] Int. Cl.$^6$ .................................................. B01D 35/06
[52] U.S. Cl. ........................................... 210/222; 210/695
[58] Field of Search .................................... 210/222, 223; 123/536, 538

[56] References Cited

U.S. PATENT DOCUMENTS

| | | | |
|---|---|---|---|
| 2,825,464 | 3/1958 | Mack ....................................... | 210/222 |
| 3,680,705 | 8/1972 | Happ et al. .............................. | 210/222 |
| 4,167,480 | 9/1979 | Mach . | |
| 4,216,092 | 8/1980 | Shalhoob et al. ........................ | 210/222 |
| 4,299,700 | 11/1981 | Sanderson ................................ | 210/222 |
| 4,299,701 | 11/1981 | Garrett et al. ........................... | 210/222 |
| 4,532,040 | 7/1985 | Meeks et al. ............................ | 210/222 |

FOREIGN PATENT DOCUMENTS 649-441  1/1976  U.S.S.R. .

*Primary Examiner*—David A. Reifsnyder
*Attorney, Agent, or Firm*—W. Thomas Timmons; Timmons & Kelly

[57] ABSTRACT

A fluid treatment apparatus (A) has an outer casing (12) with a central longitudinal bore (10) with a first and second ends (20,22) to ionize the fluid to be treated. First and second adapter sections (24, 26) have central bores (28, 30) for joining the outer casing (12) with pipes. A plurality of elongated magnets (32) have their longitudinal axis (34) parallel to the longitudinal sides (14) of the casing (12). At least one first support (36) extends between the longitudinal sides (14) of the casing (12) in the longitudinal bore (10) and is supported in proximity to the central bore's first end (20). At least one second support (38) extends between the longitudinal sides (14) in the longitudinal bore (10) and is supported in proximity to the central bore's second end (22). At least two magnets (32) are held between the first and second supports (36, 38) to form a row section (40) of magnets.

31 Claims, 3 Drawing Sheets

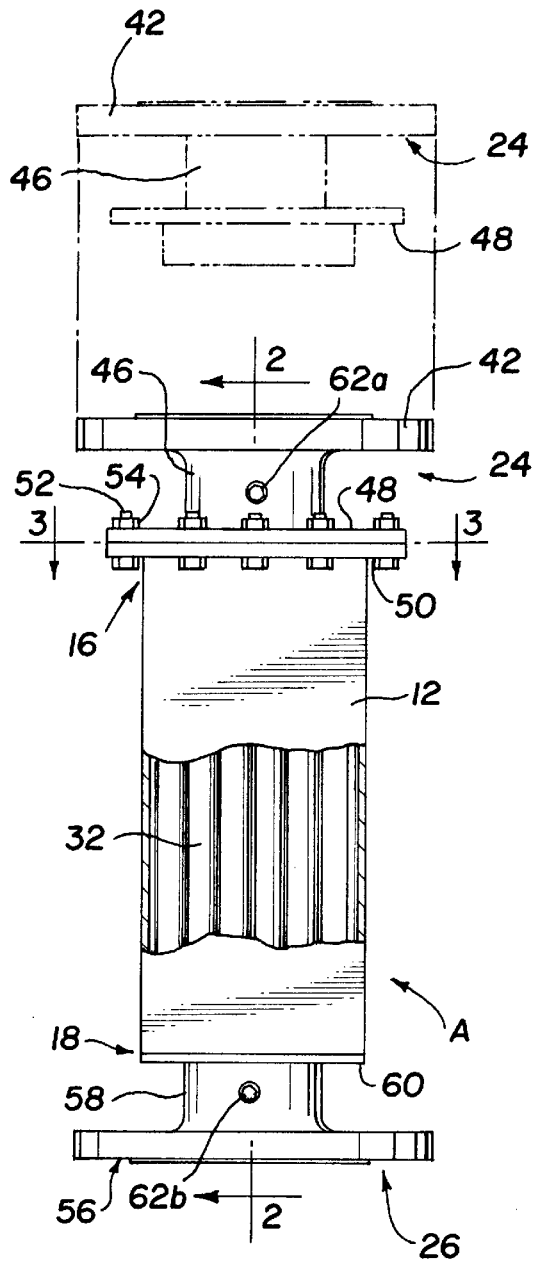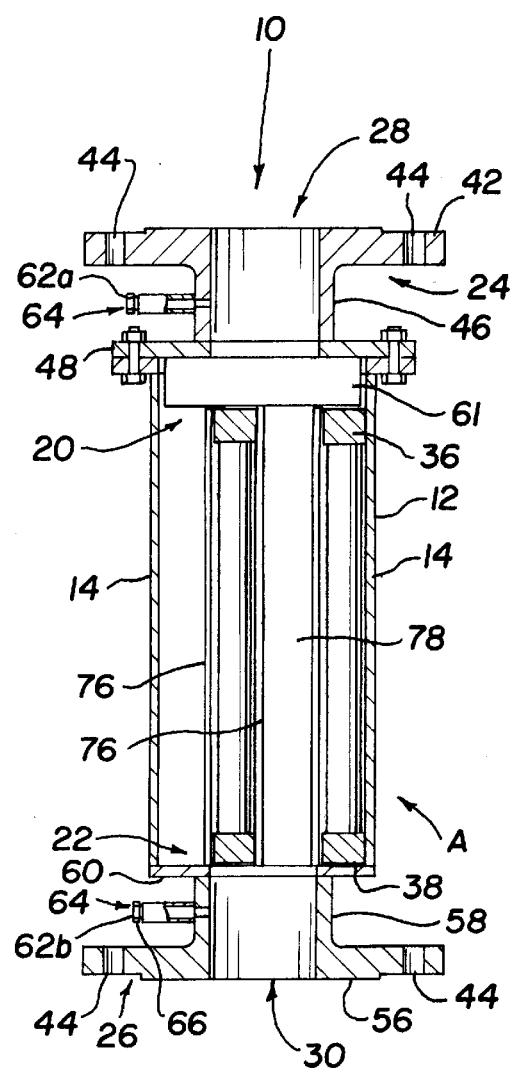
Fig. 1
Fig. 2

MAGNETIC LIQUID CONDITIONER

BACKGROUND OF THE INVENTION

1. Technical Field

The invention relates to the field of conditioning liquids and more particularly to devices having the property of treating liquids with a magnetic field.

2. Background Art

When water is used in boilers, cooling towers or other heating or cooling systems, as the temperature of the water or other liquid is raised or lowered, a hard scale frequently forms on the walls of the tubes and boiler. This scale is difficult to remove and decreases both the efficiency of the heat transfer to the water and the life of the equipment. The system must be shut down and periodically treated with harsh acids in other to remove the built-up scale, which method is very corrosive to the system itself.

It has been discovered that if the water or liquid is passed through a magnetic field prior to its entry into the heating system that the water becomes ionized such that the scale is not formed on the boiler or tubes carrying the water.

Typical of prior magnetic fluid treatment apparatus is U.S. Pat. No. 4,532,040 that discloses a device having a casing for placement in the path or circuit for the liquid and includes inner and outer coaxial rings of magnets. Other hydro-magnetic devices are taught by U.S. Pat. Nos. 2,825,464; 3,680,705; 4,167,480; 4,216,092; 4,299,700; and, 4,299,701; and Soviet Union 649-441.

While the above cited references introduce and disclose a number of noteworthy advances and technological improvements within the art, none completely fulfills the specific objectives achieved by this invention.

DISCLOSURE OF INVENTION

In accordance with the present invention, a fluid treatment apparatus has a central longitudinal bore to ionize the fluid to be treated. An outer casing has at least two essentially parallel longitudinal sides and inlet and outlet ends. The central longitudinal bore through the outer casing has a first and second end. First and second adapter sections have central bores for joining the outer casing at its inlet and outlet ends with pipes. A plurality of elongated magnets have their longitudinal axis parallel to the longitudinal sides of the casing. At least one first magnet support extends between the longitudinal sides of the casing in the longitudinal bore and is mounted in proximity to the first end of the longitudinal bore. Similarly, at least one magnet second support extends between the longitudinal sides of the casing in the longitudinal bore and is mounted in proximity to the second end of the longitudinal bore. At least two magnets are held between the first and second supports to form a row section of magnets such that the fluid flows through the longitudinal central bore along the longitudinal axis of the magnets and becomes ionized from the magnetic field induced by the elongated magnets.

The present invention has the advantages of easier construction and maintenance and may be constructed as standardized units that may be combined serially in accordance with the application's conditions.

A primary object of the fluid treatment apparatus is to ionize the fluid as it flows through the device.

A further object of the invention is rapid assembly and disassembly of the magnetic components that are mounted within the bore of the outer housing.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIG. 1 is a longitudinal view of the fluid treatment apparatus of the present invention.

FIG. 2 is a cross sectional view taken along line 2—2 of FIG. 1.

MODE(S) FOR CARRYING OUT THE INVENTION

Figure 3:
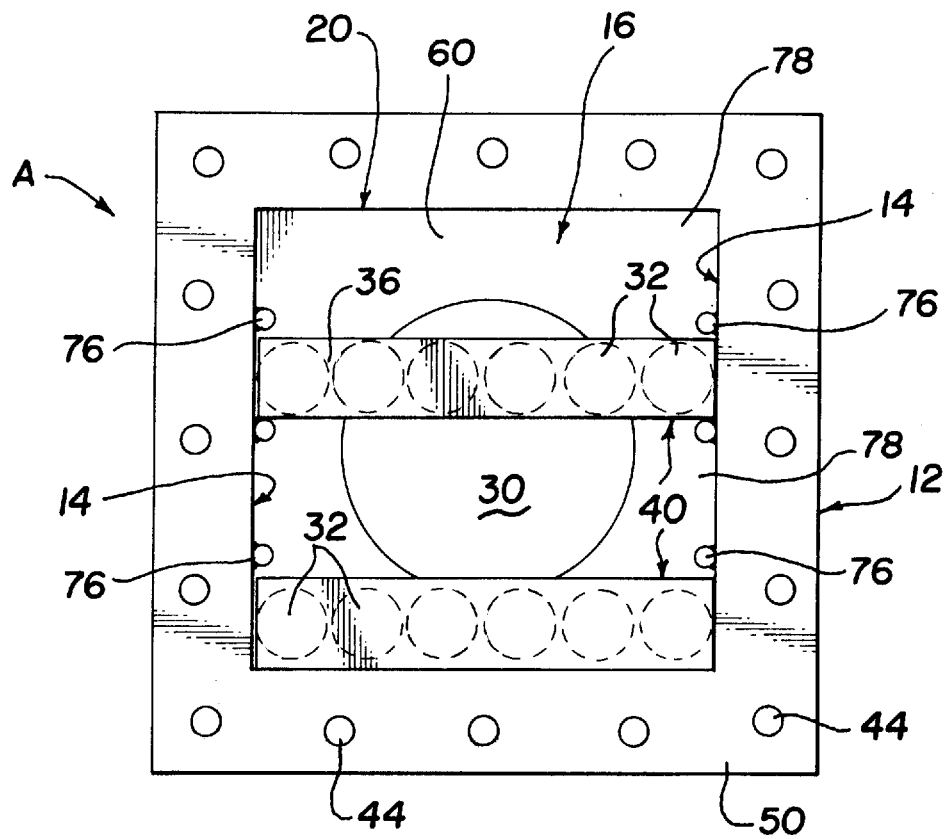
FIG. 3 is an end view looking into the outer housing of the present invention taken along line 3—3 of FIG. 1.

So that the manner in which the above recited features, advantages and objects of the present invention are attained can be understood in detail more particular description of the invention, briefly summarized above, may be had by reference to the embodiment thereof that is illustrated in the appended drawings. In all the drawings, identical numbers represent the same elements.

Referring now particularly to FIGS. 1 and 2 of the drawings, a fluid treatment apparatus A has a central longitudinal bore 10 to ionize the fluid (not shown) to be treated. An outer casing 12 has at least two essentially parallel longitudinal sides 14 and inlet and outlet ends 16 and 18, respectively. The central longitudinal bore 10 through the outer casing 12 has a first and second end 20 and 22, respectively. First and second adapter sections 24 and 26, respectively, have central bores 28 and 30 for joining the outer casing 12 at its inlet 16 and outlet 18 ends with pipes (not shown). A plurality of elongated magnets 32 have their longitudinal axis 34 parallel to the longitudinal sides 14 of the casing 12. At least one first magnet support 36 extends between the longitudinal sides 14 of the casing 12 in the longitudinal bore 10 and is supported in proximity to the first end 20 of the longitudinal bore 10. At least one second magnet support 38 extends between the longitudinal sides 14 of the casing 12 in the longitudinal bore 10 and is supported in proximity to the second end 22 of the longitudinal bore 10. At least two magnets 32 are held between the first and second supports 36 and 38 to form a row section 40 of magnets 32 such that the fluid flows through the longitudinal central bore 10 along the longitudinal axis 34 of the magnets 32 and becomes ionized from the magnetic field induced by the elongated magnets 32.

The outer casing 12 is constructed from any sturdy material that is appropriate to the application chosen, such as stainless steel. Optionally, the outer casing 12 may be made from a non-magnetizable material, such as plastic or resin adapted to withstand the pressure, temperature and corrosiveness of the liquid passing through the apparatus A. Preferably, the outer casing has two sides 14 that are spaced-apart, flat and parallel. The longitudinal central bore 10 is formed in the interior of the outer casing 12. Typically, the cross section of the outer casing 12 is rectangular or square (FIG. 3). The cross-section size and length of the outer casing 12 is chosen in accordance with the rate of fluid flow to be treated and the type and size of the magnets 32 being used in the application.

A first adapter section 24 to join the outer casing 12 to an end of a pipe (not shown) is formed on the inlet end 16 of the outer casing 12. Preferably, the first adapter section 24 is separate from the outer casing 12 as is shown in phantom in FIG. 1. The first adapter section 24 optionally may be made from a non-magnetic material, such as a mild steel to isolate the magnetic field of the fluid treatment apparatus A from the rest of the pipe circuit. The first adapter section includes an upper flange 42 having bolt holes 44 therethrough for coupling with an end of a pipe. A throat section 46 extends between the upper flange 42 and a lower flange 48. The lower flange 48 engages an upper flange section 50 of the inlet end 16 of the outer casing 12. The first adapter section 24 may be secured to the outer casing 12 with complementary bolts 52 and nuts 54 permitting the disassembly of the first adapter section 24 from the outer casing 12 for ease of maintenance of the interior components of the present invention. A central bore 28 of the first adapter section 24 communicates with the first end 20 of the central bore 10 of the outer casing 12.

FIGS. 1 and 2 also show the second adapter section 26 formed with or welded onto the outlet end 18 of the outer casing 12. A lower flange 56 is joined by a throat section 58 to an upper plate 60. The upper plate 60 extends and seals the outlet end 18 of the outer casing 12. A central bore 30 of the second adapter section 26 communicates with the second end 22 of the central bore 10 of the outer casing 12. The bores 28, 10, and 30 are contiguous to allow the flow of the liquid to be treated through the apparatus A. The lower flange 56 is adapted to receive a outlet pipe that receives the liquid having been treated. Alternatively, the upper flange 42 and lower flange 56 may be adapted to serially join several fluid treatment apparatus A to further treat the liquid. This would allow a standard design and specification to be used in a variety of situations by adding several units of the fluid treatment apparatus A in series.

Figure 4:
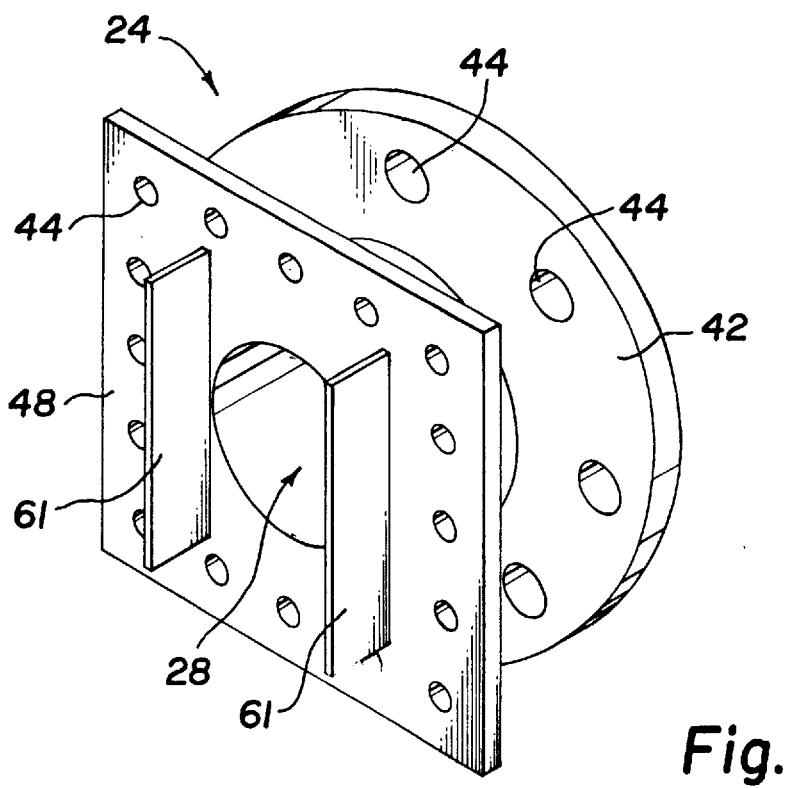
FIG. 4 is a perspective view of the adapter.
Figure 5:
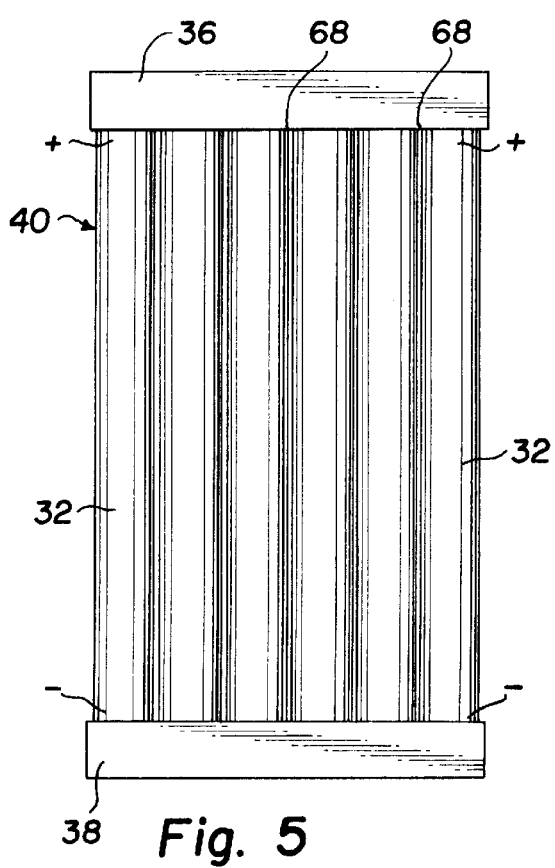
FIG. 5 is a side view of a grouping of magnets for mounting in the interior of the outer housing.
Figure 6:
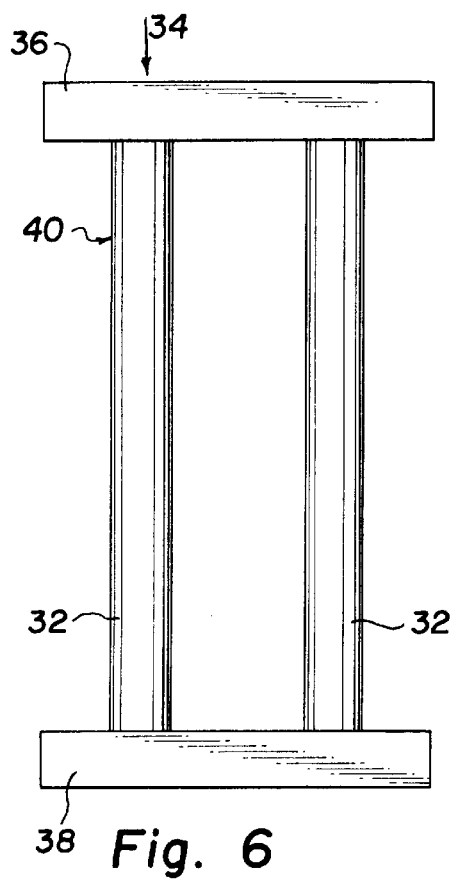
FIG. 6 is a side view of a second grouping of magnets extending between two support beams.

Referring to FIGS. 2 and 4, optional fins or spacers 61 extend from the lower flange 48 of the first adapter section 24. The spacers 61 are made of a non-magnetic material to separate the magnetic field from the magnets 32 from the adjoining pipe circuit. As shown in FIG. 2, the spacers 61 are positioned between the lower flange 48 and the top of the first magnet support 36. Spacers 61 may optionally be placed between the second magnet support 38 and the upper plate 26 of the second adapter section 26. (Not shown)

Desirably, sampling ports 62a and 62b extend from the first adapter throat 46 and second adapter throat 58. Each sampling port 62a, 62b has an orifice 64 therethrough that communicates with the central bore 10. A locking member 66 near the ends of the sampling ports 62a, 62b selectively seals the orifices 64. Using the sampling ports allows the operator of the liquid treatment apparatus A to take fluid samples or to check fluid pressure drop across the length of the apparatus between the two ports 62a, 62b. Typically, 4 pounds of pressure differential or drop is desired between the two sampling ports for proper operation of the apparatus A.

Referring particularly to FIGS. 5 through 8, a plurality of elongated magnets 32 have their longitudinal axis 34 parallel to the longitudinal sides 14 of the casing 12. At least one first magnet support 36 extends between the longitudinal sides 14 of the casing 12 in the longitudinal bore 10 and is supported in proximity to the first end 20 of the longitudinal bore 10. At least one second magnet support 38 extends between the longitudinal sides 14 of the casing 12 in the longitudinal bore 10 and is supported in proximity to the second end 22 of the longitudinal bore 10.

At least two magnets 32 are held between the first and second supports 36 and 38 to form a row section 40 of magnets 32 such that the fluid flows through the longitudinal central bore 10 along the longitudinal axis 34 of the magnets 32 and becomes ionized from the magnetic field induced by the elongated magnets 32.

Non-magnetic spacers or supports 68 may be placed or formed between pairs of magnets 32 in the magnetic row section 40. These spacers 68 add support to the magnetic row sections 40 and help to guide the fluid flow through the central bore 10. The non-magnetic spacers 68 may be constructed from a non-magnetic metal, such as stainless steel, or may be a resin or epoxy binding the components of the magnetic row section 40 together.

The first magnet support 36 and second magnet support 38 may be formed from a U-shaped metallic beam, such as non-corrosive stainless steel. The ends 70 of the magnets 32 would be held in the interior channel 72 of the U-shaped beam member. Alternatively, the supports 36 and 38 may be formed from pieces of wood, or molded blocks of epoxy or resin, or any other suitable materials to secure the magnets 32 and withstand the often harsh conditions within the longitudinal bore 10.

The magnetic poles of the individual magnets 32 should be aligned such that all the poles at their ends 70 are the same at each end of the magnetic row section 40. See FIG. 5.

A row section or grouping may also be completely non-magnetic. Such a non-magnetic row section can be used as a spacer element between pairs of magnetic row sections 40. A non-magnetic row section may have any appearance, but its size should be comparable to the gap between pairs of the magnetic row sections 40 and its appearance may resemble or be identical to the row sections of FIGS. 5 through 7.

Figure 7:
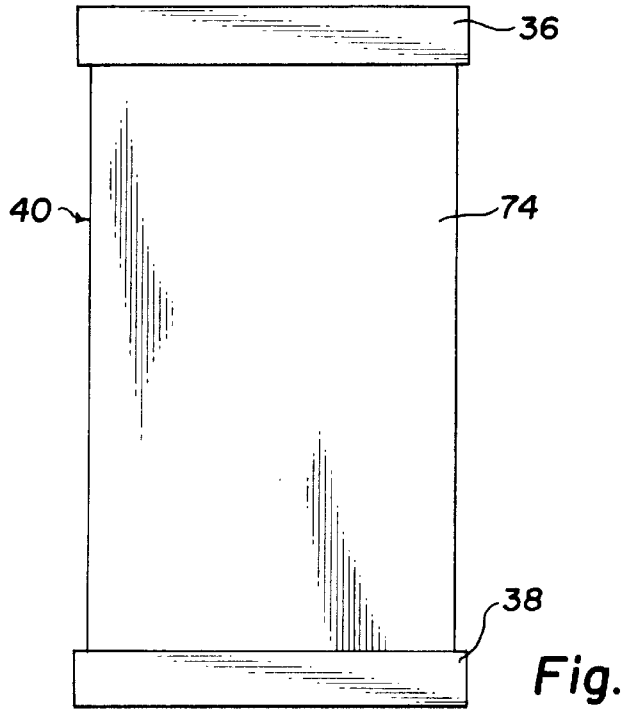
FIG. 7 is a side view of an alternative embodiments of the magnets for mounting in the interior of the outer housing.

FIG. 7 shows an alternative row section 40 comprising either a magnetic slab 72 extending between the first and second magnet supports 36, 38 or a grouping of individual magnets within an epoxy block that was formed around the grouping of magnets.

While the components of the apparatus A may be sealed together, typically and for the ease of maintenance and construction, the row sections are removable from the outer casing 12. The operator can remove the first adapter section 24 from the inlet end 16 of the outer casing 12 exposing the first magnet supports 36. Both the first and second magnet supports 36, 38 are desirably removable from the outer casing 12. The operator can then easily pull out or extract one or more of the magnet row sections 40 or non-magnetic row spacers. FIG. 3 shows the inlet end 16 of the outer casing 12 having two row sections 40 in place. In FIG. 2 the second or lower magnet support 38 of a row section 40 is shown resting on the upper plate 60 of the second adapter 26 and the upper or first magnet support 36 is being secured in place by the non-magnetic fins 61 attached to the upper or first adapter section 24.

Preferably, guide rails 76 are formed on or with the parallel sides 14 in the longitudinal central bore 10 to guide the placement of the magnet row sections 40 or the non-magnetic row spacers being inserted into the central bore 10. The guide rails in FIGS. 2 and 3 may be cylinders or tubes that have been welded or otherwise attached to the parallel sides 14 down at least a portion of the longitudinal bore 10.

Figure 8:
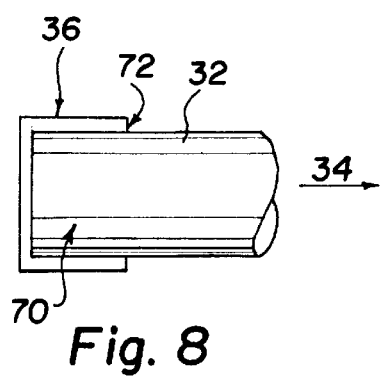
FIG. 8 is a detail view of a magnet positioned in a U-channel beam.

The magnets 32 themselves are any known type, such as metallic permanent magnets or electromagnets. Generally, the magnets 32 are composed of a type of alnico metal, also known as AL 5, or from another material having highly retentive magnetic properties, which material is then formed into bars, rods or cylinders for the use. The magnetic field strength of the magnets generally is in the range of 2000 to 4000 Gauss, depending on the application. The magnets 32 may be formed having a circular cross-section as is shown in FIG. 8.

Operation

In operation of the present invention, the size, composition, and magnetic strength of the apparatus A is chosen to be compatible with the application. The apparatus A is placed and connected within a pipe or fluid flow circuit for the fluid to be treated. The fluid to be treated flows into the central bore 28 of the first adapter section 24. The fluid then flows into the central bore 10 of the outer casing 12 passing through the channels or grooves 78 between the magnetic row sections 40 or non-magnetic spacer row sections. The fluid flows in the direction along the longitudinal axis 34 of the magnets and is subject to being ionized by the magnetic field that it passes through the field. The fluid having been treated then passes out of the outlet end 18 of the outer casing 12 and into the central bore 30 of the second adapter section 26, then exiting therefrom back into the pipe circuit. As stated above more than one fluid treatment or ionizing apparatus A can be joined serially for repeated treatment of the fluid.

The foregoing disclosure and description of the invention are illustrative and explanatory thereof and various changes in the size, shape and materials, as well as in the details of the illustrated construction may be made without departing from the spirit of the invention.

I claim:

1. A fluid treatment apparatus having a central longitudinal bore for ionizing a fluid to be treated comprising:

an outer casing having at least two essentially parallel longitudinal sides and inlet and outlet ends;

said central longitudinal bore through said outer casing having a first and second end;

a first adapter section having a central bore for receiving the fluid and communicating the fluid to the central bore of the outer casing at said first end;

a second adapter section having a central bore for communicating the fluid out of the central bore of the outer casing at said second end;

a plurality of elongated magnets having a longitudinal axis parallel to said longitudinal sides of said casing;

at least one first support extending between said longitudinal sides of said casing in the longitudinal bore mounted in proximity to said first end of the longitudinal bore;

at least one second support extending between said longitudinal sides of said casing in the longitudinal bore mounted in proximity to said second end of the longitudinal bore; and, at least two magnets held between said first and second supports forming a straight row section of magnets;

whereby the fluid flows through the longitudinal central bore along the longitudinal axis of the magnets and becomes ionized from the magnetic field induced by the elongated magnets.

2. The invention of claim 1 wherein the magnets are arranged having same magnetic poles aligned towards said first and second ends of the longitudinal bore.

3. The invention of claim 1 further including at least two row sections of magnets secured in a spaced apart parallel relationship in the longitudinal central bore of the casing.

4. The invention of claim 3 further including at least one non-magnetic spacer row positioned between two row sections of magnets.

5. The invention of claim 1 further including non-magnetic spacers disposed between pairs of said magnets extending between said first and second supports.

6. The invention of claim 1 wherein said casing includes sampling ports therethrough for communicating with the first and second ends of the central longitudinal bore.

7. The invention of claim 1 further including a non-magnetic adapter spacer disposed between said first magnet support and said first adapter.

8. The invention of claim 1 wherein said first magnet support is removable.

9. The invention of claim 1 wherein said second magnet support is removable.

10. The invention of claim 1 further including non-magnetic guides rails formed with said parallel sides in the longitudinal central bore to guide the placement of said magnet row sections.

11. The invention of claim 1 wherein said outer casing is non-magnetizable.

12. The invention of claim 1 wherein said magnets have a field strength between 2000 and 4000 Gauss.

13. The invention of claim 1 wherein said magnets comprise electro-magnets.

14. The invention of claim 1 wherein said magnets comprise metallic permanent magnets.

15. The invention of claim 1 wherein said elongated magnets have a circular cross-section.

16. The invention of claim 1 wherein said casing has a square cross-section.

17. A fluid ionizing device having a central longitudinal bore for ionizing a fluid to be treated comprising:

an outer casing having at least two essentially parallel longitudinal sides and inlet and outlet ends;

said central longitudinal bore through said outer casing having a first and second end;

a first adapter section having a central bore for receiving the fluid and communicating the fluid to the central bore of the outer casing at said inlet end of said casing;

a second adapter section having a central bore for communicating the fluid out of the central bore of the outer casing at said outlet end of said casing;

a plurality of elongated magnets having a longitudinal axis parallel to said longitudinal sides of said casing;

at least one first support extending between said longitudinal sides of said casing in the longitudinal bore mounted in proximity to said first end of the longitudinal bore;

at least one second support extending between said longitudinal sides of said casing in the longitudinal bore mounted in proximity to said second end of the longitudinal bore; and, at least two magnets held between said first and second supports forming a row section of magnets; and, at least two straight row sections of magnets secured in a spaced apart parallel relationship in the longitudinal central bore of the casing;

whereby the fluid flows through the longitudinal central bore along the longitudinal axis of the magnets and becomes ionized from the magnetic field induced by the elongated magnets.

18. The invention of claim 17 wherein the magnets are arranged having same magnetic poles aligned towards said first and second ends of the longitudinal bore.

19. The invention of claim 17 further including non-magnetic spacers disposed between pairs of said magnets extending between said first and second supports.

20. The invention of claim 17 further including at least one non-magnetic spacer row positioned between two row sections of magnets.

21. The invention of claim 17 wherein said casing includes sampling ports therethrough for communicating with the first and second ends of the central longitudinal bore.

22. The invention of claim 17 further including a non-magnetic adapter spacer disposed between said first magnet support and said first adapter.

23. The invention of claim 17 wherein said first magnet support is removable.

24. The invention of claim 17 wherein said second magnet support is removable.

25. The invention of claim 17 further including non-magnetic guides rails formed with said parallel sides in the longitudinal central bore to guide the placement of said magnet row sections.

26. The invention of claim 17 wherein said outer casing is non-magnetizable.

27. The invention of claim 17 wherein said magnets have a field strength between 2000 and 4000 Gauss.

28. The invention of claim 17 wherein said magnets comprise electro-magnets.

29. The invention of claim 17 wherein said magnets comprise metallic permanent magnets.

30. The invention of claim 17 wherein said elongated magnets have a circular cross-section.

31. The invention of claim 17 wherein said casing has a square cross-section.

* * * * *